United States Patent [19]

Wandrack

[11] 4,283,114
[45] Aug. 11, 1981

[54] FIBER OPTIC LIGHT VALVE
[75] Inventor: Joseph Wandrack, Groton, Conn.
[73] Assignee: The United States of America as represented by the Secretary of the Navy, Washington, D.C.
[21] Appl. No.: 139,315
[22] Filed: Apr. 11, 1980
[51] Int. Cl.³ .............................................. G02B 5/14
[52] U.S. Cl. .................................. 350/96.20; 73/705; 310/318; 350/356; 350/393
[58] Field of Search ..................... 350/96.20, 392, 393, 350/356; 310/318, 327; 73/705
[56] References Cited

U.S. PATENT DOCUMENTS

| | | | |
|---|---|---|---|
| 3,215,038 | 11/1965 | Heller et al. | 350/356 |
| 3,393,956 | 7/1968 | Clark | 350/391 |
| 3,614,451 | 10/1971 | Gunn | 250/550 |
| 4,121,884 | 10/1978 | Greenwood | 350/96.20 |
| 4,137,475 | 1/1979 | Yoshida et al. | 310/323 |

Primary Examiner—Stewart J. Levy
Attorney, Agent, or Firm—Richard S. Sciascia; Joseph M. St.Amand

[57] ABSTRACT

A mechanically actuated, piezoelectrically powered, fiber optic connected light valve (shutter) utilized as a sensor to detect mechanical motion (pressure) or displacement. A piezoelectric element responds to pressure to generate an electrical signal which is applied to a Kerr cell containing nitrobenzene; the signal in turn renders the nitrobenzene transparent and light via fiber optic means is allowed to pass through the Kerr cell and return to the light source location for sensing.

9 Claims, 2 Drawing Figures

FIBER OPTIC LIGHT VALVE

BACKGROUND OF THE INVENTION

Limit switches presently in use require an external electrical power source and the necessary electrical wiring for operation. Providing electrical power to these limit switches; adds to electromagnetic interference levels that can create problems with other equipment being used; electrical wiring and signals are vulnerable to short circuits in salt water areas; and, there is shock hazard when trouble shooting for repair purposes.

Fiber optics can be used to implement a completely self-powered, pressure sensitive limit/position detecting device to replace electrical limit switches. The switch of this invention requires no outside electrical power source. This invention replaces the presently used limit switches, electrically powered from an external power source, with a device which utilizes fiber optic transmission of light as the signal medium. The system involved eliminates the need for electric power or reference voltage to remote limit switch devices and eliminates electromagnetic interference problems, saltwater short circuits and electrical hazards to personnel.

A different type prior device which senses linear displacement, uses a liquid crystal cell whose thickness is changed by pressure, and with a certain deformation the threshold voltage of the cell falls below a supply voltage and the cell becomes opaque to a light source; the binary output of the cell can be used to operate a relay. Another pressure measuring device involves a light transmitting rod where pressure applied to the rod varies the amount of light transmitted to a sensor. Also, devices are available that permit light to pass when an electric field is applied. However, none of the prior devices use a piezoelectric pressure sensor for supplying an electric field to a Kerr cell, nor do they control a Kerr cell as a light switch for remote sensing of pressure, as does the device of the present invention.

SUMMARY OF THE INVENTION

This invention uses a piezoelectric element that responds to pressure to generate an electrical signal which is applied to a Kerr cell containing nitrobenzene. The electrical signal renders the nitrobenzene transparent and a light pulse via fiber optic means is allowed to pass through the Kerr cell and back to the light source location for sensing purposes.

DESCRIPTION OF THE PREFERRED EMBODIMENT

Figure 1:
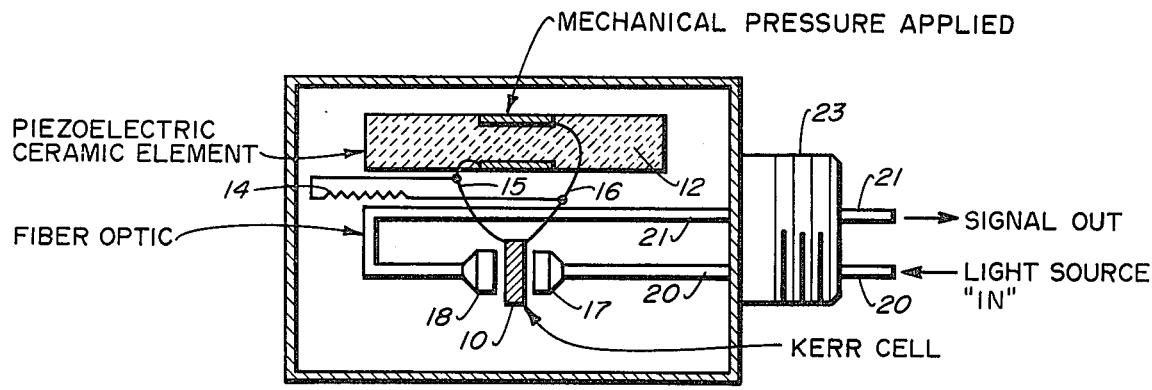
FIG. 1 is a schematic circuit diagram illustrating the fiber optic switch of the present invention.

As can be seen from FIG. 1, a Kerr cell 10 is electrically connected to a piezoelectric ceramic element 12 by leads 15 and 16. Kerr cells are used as ultra high speed camera shutters and therefore can operate in this device at same type of rapidity. The Kerr cell 10 has transparent electrodes on opposite sides and leads 15 and 16 are wired to these electrodes. A high megohm value resistor 14 provides a current bleeder path to prevent a high voltage, static electricity, build-up from inhibiting the on-off response time of the Kerr cell 10. Piezoelectric ceramic element 12 is similar to the type used for small engine ignition, gas stove lighters, and propane cigarette lighters.

Polarizers 17 and 18 are located, as shown in FIG. 1, one on each side of Kerr cell 10. Standard plastic polarizers are used as polarizers 17 and 18 to set a standard light level-sensitivity adjust. Fiber optic line 20 is connected to polarizer 17, and fiber optic line 21 is connected to polarizer 18. Connector 23 is an optical analog of an electrical connector. Kerr cell 10 is filled with nitrobenzene which is normally photo-opaque; other suitable materials, which operate like the nitrobenzene in performance, could also be used. The light source "IN" passes through fiber optic 20 and polarizer 17 and is stopped by Kerr cell 10. In the presence of an electric field, the nitrobenzene in the Kerr cell will clear and become transparent. The electric field is provided by pressure being applied to piezoelectric ceramic element 12. When the Kerr cell becomes transparent light is allowed to pass through the Kerr cell to polarizer 18 and fiber optic 21, providing a light signal "OUT".

Figure 2:
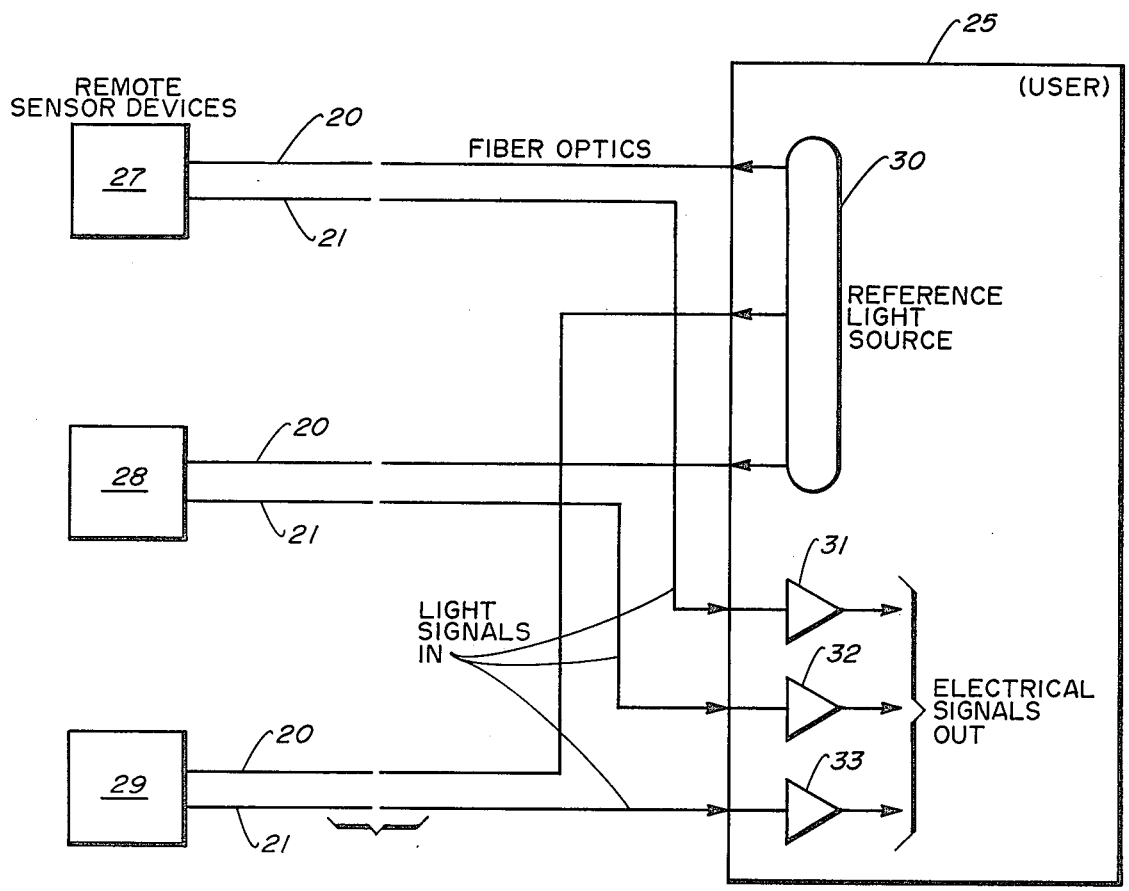
FIG. 2 is also a schematic diagram, showing the central system where signals from the switch device of FIG. 1 are received.

The signal receiver and the source of light source "IN" are located in a central system (user) 25, such as shown in FIG. 2. As shown in FIG. 2, several sensor devices, such as 27, 28, 29, etd., are connected by fiber optics to a master or reference light source 30 and to photosensitive receiver/converters 31, 32 and 33. The reference light source 30 provides light to all remote sensor devices, such as 27, 28, and 29, via a respective fiber optics 20, and the return signal, i.e., signal out from the sensor devices is fed to respective photosensitive receiver/converters 31, 32, 33, etc., via respective fiber optics 21. The electrical signal output of the photosensitive receiver/converters can be conditioned for direct computer interface or for relay/amplifier driving as necessary.

Obviously, many modifications and variations of the present invention are possible in the light of the above teachings. It is therefore to be understood that within the scope of the appended claims the inventions may be practiced otherwise than as specifically described.

What is claimed is:

1. A self-powered limit switch for sensing mechanical motion or displacement, comprising:
   a. a sensing element means which responds to pressure to generate an electrical signal;
   b. a Kerr cell means containing a normally opaque fluid that is operable to become transparent in an electrical field;
   c. said sensing element means being electrically connected to said Kerr cell means wherein electrical signals from said sensing element means will render said Kerr cell means transparent to light;
   d. a light source means;
   e. fiber optic means for transmitting light from each light source means to said Kerr cell means and fiber optic means for transmitting light passing through said Kerr cell means back to said light source means.

2. A device as in claim 1 wherein said sensing element means is a piezoelectric ceramic element.

3. A device as in claim 1 wherein said normally opaque fluid in the Kerr cell is nitrobenzene.

4. A device as in claim 1 wherein a light polarizer means is provided on each side of said Kerr cell means, and said respective fiber optic means are connected to respective said light polarizer means.

5. A device as in claim 1 wherein said light source means includes means for converting return light signals into electrical detection signals.

6. A device as in claim 5 wherein said electrical detection signals are conditioned for direct computer interface and for relay/amplifier driving as desired.

7. A device as in claim 6 wherein said light source means provides light for operation of a plurality of limit switch devices, and includes a plurality of means for converting return light from a plurality of respective limit switch devices into respective electrical detection signals, each of said electrical detection signals being conditioned for direct computer interface and for relay/amplifier driving as desired.

8. A device as in claim 7 wherein a plurality of self-powered limit switches are connected thereto.

9. A device as in claim 1 wherein a means for providing a current bleeder path is provided across said Kerr cell means for preventing a high-voltage static-electricity build-up from inhibiting on-off response time of said Kerr cell means.

* * * * *